(12) United States Patent
Deng et al.

(10) Patent No.: US 10,374,215 B2
(45) Date of Patent: Aug. 6, 2019

(54) CENTRIFUGATION-ASSISTED PREPARATION OF ADDITIVE-FREE CARBON-DECORATED MAGNETITE ELECTRODES

(71) Applicant: WAYNE STATE UNIVERSITY, Detroit, MI (US)

(72) Inventors: Da Deng, Detroit, MI (US); Jian Zhu, Detroit, MI (US); K. Y. Simon Ng, West Bloomfield, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 196 days.

(21) Appl. No.: 14/884,939

(22) Filed: Oct. 16, 2015

(65) Prior Publication Data
US 2016/0111722 A1  Apr. 21, 2016

Related U.S. Application Data
(60) Provisional application No. 62/065,274, filed on Oct. 17, 2014.

(51) Int. Cl.
*H01M 4/525* (2010.01)
*H01M 4/583* (2010.01)
(Continued)

(52) U.S. Cl.
CPC ........... *H01M 4/0402* (2013.01); *C01B 32/15* (2017.08); *C01G 49/06* (2013.01); *C01G 49/08* (2013.01);
(Continued)

(58) Field of Classification Search
CPC .. H01M 10/0525; H01M 4/525; H01M 4/583; H01M 4/48; H01M 4/29
See application file for complete search history.

(56) References Cited

U.S. PATENT DOCUMENTS
2005/0142898 A1*  6/2005  Kim ................. H01G 11/46 438/800
2006/0040182 A1*  2/2006  Kawakami ......... H01M 10/052 429/218.1
(Continued)

FOREIGN PATENT DOCUMENTS
CN    103435105 A1 *  12/2013   ........ H01M 10/0525

OTHER PUBLICATIONS
"Monodispersed hollow carbon/Fe3O4 composite microspheres for high performance anode materials in lithium-ion batteries", Hwang et al., Journal of Power Sources, 244, p. 538-543, Feb. 16, 2013.*
(Continued)

*Primary Examiner* — Kenneth J Douyette
(74) *Attorney, Agent, or Firm* — Brinks Gilson & Lione

(57) ABSTRACT

Iron nanoparticles that are useful for constructing electrodes for lithium ion batteries and a method of making said particles is disclosed herein. The nanoparticles may include magnetite. The electrode may be constructed by centrifuging the nanoparticles to a current collector, such as a disc of copper, without the use of an extrinsic binder. The solvothermal method of making nanoparticles decreases the time of the procedure from about 24 hours to about 75 minutes. The method of making electrode decreases the complexity and number of steps compared to the conventional procedure to prepare an electrode, and eliminates the use of additives (binder and current enhancer) and toxic NMP solvents in the electrode preparation process.

7 Claims, 7 Drawing Sheets

(51) Int. Cl.
H01M 10/0525 (2010.01)
H01M 4/04 (2006.01)
H01M 4/131 (2010.01)
H01M 4/1391 (2010.01)
H01M 4/36 (2006.01)
H01M 4/52 (2010.01)
H01M 4/62 (2006.01)
C01G 49/06 (2006.01)
C01G 49/08 (2006.01)
C01B 32/15 (2017.01)
H01M 4/66 (2006.01)

(52) U.S. Cl.
CPC ......... H01M 4/131 (2013.01); H01M 4/1391 (2013.01); H01M 4/362 (2013.01); H01M 4/523 (2013.01); H01M 4/625 (2013.01); C01P 2002/60 (2013.01); C01P 2002/72 (2013.01); C01P 2002/85 (2013.01); C01P 2002/88 (2013.01); C01P 2004/03 (2013.01); C01P 2004/04 (2013.01); C01P 2004/30 (2013.01); C01P 2004/45 (2013.01); C01P 2004/62 (2013.01); C01P 2004/80 (2013.01); C01P 2006/40 (2013.01); H01M 4/661 (2013.01); H01M 10/0525 (2013.01)

(56) References Cited

U.S. PATENT DOCUMENTS

| | | | |
|---|---|---|---|
| 2010/0092865 A1* | 4/2010 | Kanno | C04B 41/009 429/221 |
| 2012/0082922 A1* | 4/2012 | Yamaki | H01M 4/02 429/532 |
| 2014/0225041 A1* | 8/2014 | Archer | H01M 4/364 252/503 |
| 2014/0294981 A1* | 10/2014 | Fichtner | C01G 49/08 424/490 |

OTHER PUBLICATIONS

"Assembling carbon-coated a-Fe2O3 hollow nanohorns on the CNT backbone for superior lithium storage capability", Wang et al., Energy and Environmental Science, 5, 5252-5256, Nov. 9, 2011.*
"α-Fe2O3 Nanorods as Anode Material for Lithium Ion Batteries", Lin et al., Journal of Physical Chemistry Letters, 2, p. 2885-2891, Oct. 28, 2011.*
"Facile synthesis of single-crystalline mesoporous a-Fe2O3 and Fe3O4 nanorods as anode materials for lithium-ion batteries", Xiao et al., Journal of Materials Chemistry, 22, p. 20566-20573, Aug. 14, 2012.*
Machine Translation of: CN 103435105 A1, Gao et al., Dec. 11, 2013.*
"Fe3O4/Fe/Carbon Composite and Its Application as Anode Material for Lithium-Ion Batteries", Zhao et al., ACS Applied Material Interfaces, 4, p. 1350-1356, Feb. 2, 2012.*
Jian Zhu, et al., "Porous olive-like carbon decorated $Fe_3O_4$ based additive-free electrodes for highly reversible lithium storage", Journal of Materials Chemistry A, Royal Society of Chemistry, Jul. 29, 2014, Downloaded on Aug. 23, 2014.
Hengchao Zhang, et al., $Fe_2O_3$/carbon quantum dots complex photocatalysts and their enhanced photocatalytic activity under visible light, The Royal Society of Chemistry 2011, Dalton Trans, 2011, pp. 10822-10825.
J.-M. Tarascon and M. Armand, "Issues and challenges facing rechargeable lithium batteries," Nature, 2001, 414, 359-367.
M. Armand and J.-M Tarascon, "Building better batteries," Nature, 2008, 451, 652-657.
L. Ji, Z. Lin, M. Alcoutlabi and X. Zhang, "Recent developments in nanostructured anode materials for rechargeable lithium-ion batteries," Energy Environ. Sci., 2011, 4, 2682-2699.

A. S. Arico, P. Bruce, B. Scrosati, J. M. Tarascon and W. Van Schalkwijk, "Nanostructured materials for advanced energy conversion and storage devices," Nat. Mater., 2005, 4, 366-377.
P. G. Bruce, B. Scrosati and J. M. Tarascon, Agnew. "Nanomaterials for Rechargeable Lithium Batteries," Chem., Int. Ed., 2008, 47, 2930-2946.
F. Cheng, J. Liang, Z. Tao and J. Chen, "Functional Materials for Rechargeable Batteries," Adv. Mater., 2011, 23, 1695-1715.
P. Poizot, S. Laruelle, S. Grugeon, L. Dupont and J. Tarascon, "Nano-sized transition-metal oxides as negative-electrode materials for lithium-ion batteries," Nature, 2000, 407, 496-499.
F. Liu, S. Song, D. Xue and H. Zhang, "Selective crystallization with preferred lithium-ion storage capability of inorganic materials," Nanoscale Res. Lett., 2012, 7, 149.
J. Zhu, K. Y.S. Ng and D. Deng, "Hollow Cocoon-Like Hematite Mesoparticles of Nanoparticle Aggregates: Structural Evolution and Superior Performances in Lithium Ion Batteries," ACS Appl. Mater. Interfaces, 2014, 6, 2996-3000.
S. M. Yuan, J. X. Li, L. T. Yang, L. W. Su, L. Liu and Z. Zhou, "Preparation and Lithium Storage Performances of Mesoporous $Fe_3O_4$@C Microcapsules," ACS Appl. Mater. Interfaces, 2011, 3, 705-709.
Y. Chen, H. Xia, L. Lu and J. Xue, J. "Synthesis of porous hollow Fe3O4 beads and their applications in lithium ion batteries," Mater. Chem., 2012, 22, 5006-5012.
Q. Q. Xioung, J. P. Tu, Y. Lu, J. Chen, Y. X. Yu, Y. Q. Qiao, X. L. Wang and C. D. Gu, "Synthesis of Hierarchical Hollow-Structured Single-Crystalline Magnetite ($Fe_3O_4$) Microshperes: The Highly Powerful Storage versus Lithium as an Anode for Lithium Ion Batteries," J. Phys. Chem. C, 2012, 116, 6495-6502.
P. L. Taberna, S. Mitra, P. Poizot, P. Simon and J. M. Tarascon, "High rate capabilities $Fe_3O_4$-based Cu nano-architectured electrodes for lithium-ion battery applications," Nat. Mater., 2006, 5, 567-573.
W. M. Zhang, X. L. Wu, J. S. Hu, Y. G. Guo and L. J. Wan, "Carbon Coated $Fe_3O_4$ Nanospindles as a Superior Anode Material for Lithium-Ion Batteries," Adv. Funct. Mater., 2008, 18, 3941-3946.
T. Muraliganth, A. Vadivel Murugan and A. Manthiram, "Facile synthesis of carbon-decorated single-crystalline $Fe_3O_4$ nanowires and their application as high performance anode in lithium ion batteries," Chem. Commun., 2009, 7360-7362, DOI: 10.1039/b916376j.
J.-K. Hwang, H.-S. Lim, Y.-K. Sun and K.-D. Suh, J., "Monodisperesed hollow carbon/$Fe_3O_4$ composite microshperes for high performance anode materials in lithium-ion batteries," Power Sources, 2013, 244, 538-543.
W. Wei, S. Yang, H. Zhou, I. Lieberwirth, X. Feng and K. Mullen, "3D Graphene Foams Cross-linked with Pre-encapsulated $Fe_3O_4$ Nanospheres for Enhanced Lithium Storage," Adv. Mater., 2013, 25, 2909-2914.
S. Jin, H. Deng, D. Long, X. Liu, L. Zhan, X. Liang, W. Qiao and L. Ling, J. "Facile synthesis of hierarchically structured $Fe_3O_4$/carbon micro-flowers and their application to lithium-ion battery anodes," Power Sources, 2011, 196, 3887-3893.
T. Yoon, C. Chae, Y.-K. Sun, X. Zhao, H. H. Kung and J. K. Lee, "Bottom-up in situ formation of $Fe_3O_4$ nanocrystals in a porous carbon foam for lithium-ion battery anodes," J. Mater. Chem., 2011, 21, 17325-17330.
M. Zhang, D. Lei, X. Yin, L. Chen, Q. Li, Y. Wang and T. Wang, "Magnetite/graphene composites: microwave irradiation synthesis and enhanced cycling and rate performances for lithium ion batteries," J. Mater. Chem., 2010, 20, 5538-5543.
L. Wang, J. Liang, Y. Zhu, T. Mei, X. Zhang, Q. Yang and Y. Qian, "Synthesis of $Fe_3O_4$@C core-shell nanorings and their enhanced electrochemical performance for lithium-ion batteries," Nanoscale, 2013, 5, 3627-3631.
C. He, S. Wu, N. Zhao, C. Shi, E. Liu and J. Li, "Carbon-Encapsulated $Fe_3O_4$ Nanoparticles as a High-Rate Lithium Ion Battery Anode Material," 2013, 7, 4459-4469.
L. Zhang, H. B. Wu and X. W. Lou, "Iron-Oxide-Based Advanced Anode Materials for Lithium-Ion Batteries," Adv. Energy Mater., 2014, 4, 1300958.

(56) References Cited

OTHER PUBLICATIONS

G. X. Gao, L. Yu, H. B. Wu and X. W. Lou, "Hierarchical Tubular Structures Constructed by Carbon-coated α-$Fe_2O_3$ Nanorods for Highly Reversible Lithium Storage," Small, 2014, 10, 1741-1745.

L. Zhang, H. B. Wu, R. Xu and X. W. Lou, "Porous $Fe_2O_3$ nanocubes derived from MOFs for highly reversible lithium storage," CrystEngComm, 2013, 15, 9332-9335.

L. Zhang, H. B. Wu and X. W. Lou, "Metal-Organic-Frameworks-Derived General Formation of Hollow Structures with High Complexity," J. Am. Chem. Soc., 2013, 135, 10664-10672.

L. Zhang, H. B. Wu, S. Madhavi, H. H. Hng and X. W. Lou, "Formation of $Fe_2O_3$ Microboxes with Hierarchical Shell Structures from Metal-Organic Frameworks and Their Lithium Storage Properties," J. Am. Chem. Soc., 2012, 134, 17388-17391.

Z. Y. Wang, D. Y. Luan, S. Madhavi, S. M. Li and X. W. Lou, "α-$Fe_2O_3$ nanotubes with superior lithium storage capability," Chem. Commun., 2011, 47, 8061-8063.

J. S. Chen, T. Zhu, X. H. Yang, H. G. Yang and X. W. Lou, "Top-Down Fabrication of α-$Fe_2O_3$ Single-Crystal Nanodiscs and Microparticles with Tunable Porosity for Largely Improved Lithium Storage Properties," J. Am. Chem. Soc., 2010, 132, 13162-13164.

B. Wang, J. S. Chen, H. B. Wu, Z. Y. Wang and X. W. Lou, "Quasiemulsion-Templated Formation of α-$Fe_2O_3$ Hollow Spheres with Enhanced Lithium Storage Properties," J. Am. Chem. Soc., 2011, 133, 17146-17148.

B. Wang, H. B. Wu, L. Zhang and X. W. Lou, Agnew. "Self-Supported Construction of Uniform $Fe_3O_4$ Hollow Microsheres from Nanoplate Building Blocks," Chem., Int. Ed., 2013, 52, 4165-4168.

J. S. Chen, Y. M. Zhang and X. W. Lou, "One-Pot Synthesis of Uniform $Fe_3O_4$ Nanoshperes with Carbon Matrix Support for Improved Lithium Storage Capabilities," ACS Appl. Mater. Interfaces, 2011, 3, 3276-3279.

D. Deng and J. Y. Lee, "Hollow Core-Shell Mesoshperes of Crystalline $SnO_2$ Nanoparticle Aggregates for High Capacity Li Ion Storage," Chem. Mater., 2008, 20, 1841-1846.

T. Zhu, J. S. Chen and X. W. Lou, "Glucose-Assisted One-Pot Synthesis of FeOOH Nanorods and Their Transformation to $Fe_3O_4$@Carbon Nanorods for Application in Lithium Ion Batteries," J. Phys. Chem. C, 2011, 115, 9814-9820.

K. C. Chin, G. L. Chong, C. K. Poh, L. H. Van, C. H. Sow, J. Lin and A. T. S. Wee, "Large-Scale Synthesis of $Fe_3O_4$ Nanosheets at Low Temperature," J. Phys. Chem. C, 2007, 111, 9136-9141.

K. Charette, J. Zhu, S. O. Salley, K. Y. S. Ng and D. Deng, "Gram-scale synthesis of high-temperature (900° C.) stable anatase TiOC) stable anatase TiO2C) stable anatase $TiO_2$ nanostructures assembled by tunable building subunits for safer lithium ion batteries," RSC Adv., 2014, 4, 2557-2562.

Z. Xiao, Y. Xia, Z. Ren, Z. Liu, G. Xu, C. Chao, X. Li, G. Shen and G. Han, "Facile synthesis of single-crystalline mesoporous α-$Fe_2O_3$ and $Fe_3O_4$ nanorods as anode materials for lithium-ion batteries," J. Mater. Chem., 2012, 22, 20566-20573.

J. Chen, L. Xu, W. Li and X. Gou, "α-$Fe_2O_3$ Nanotubes in Gas Sensor and Lithium-Ion Battery Applications," Adv. Mater., 2005, 17, 582-586.

S. H. Lee, S.-H. Yu, J. E. Lee, A. Jin, D. J. Lee, N. Lee, H. Jo, K. Shin, T.-Y. Ahn, Y.-W. Kim, H. Choe, Y.-E. Sung and T. Hyeon, "Self-Assembled $Fe_3O_4$ Nanoparticle Clusters as High-Performance Anodes for Lithium Ion Batteries via Geometric Confinement," Nano Lett., 2013, 13, 4249-4256.

X. Zhu, Y. Zhu, S. Murali, M. D. Stoller and R. S. Ruoff, "Nanostructured Reduced Graphene Oxide/$Fe_2O_3$ Composite as a High-Performance Anode Material for Lithium Ion Batteries," ACS Nano, 2011, 5, 3333-3338.

L. Qie, W.-M. Chen, Z.-H. Wang, Q.-G. Shao, X. Li, L.-X. Yuan, X.-L. Hu, W.-X. Zhang and Y.-H Huang, "Nitrogen-Doped Porous Carbon Nanofiber Webs as Anodes for Lithium Ion Batteries with a Superhigh Capacity and Rate Capability," Adv. Mater., 2012, 24, 2047-2050.

Y. Piao, H.S. Kim, Y.-E. Sung and T. Hyeon, Chem. Commun., 2010, 46, 118-120.

Z. Wang, D. Luan, S. Madhavi, Y. Hu and X. W. Lou, Energy Environ. Sci., 2012, 5, 5252-5256.

\* cited by examiner

FIG. 6
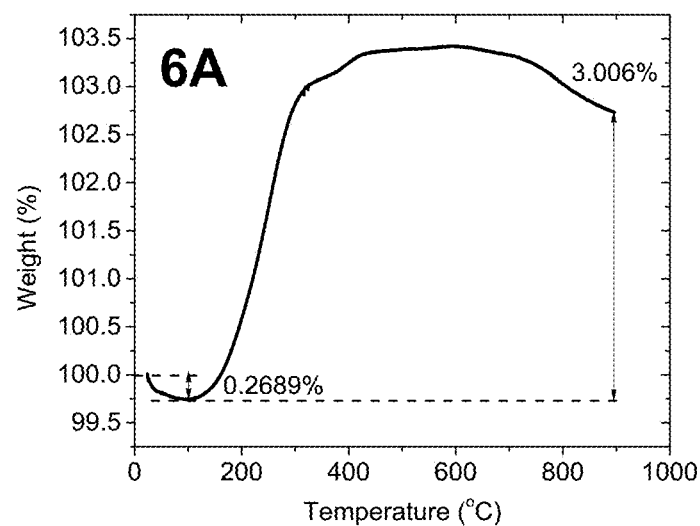
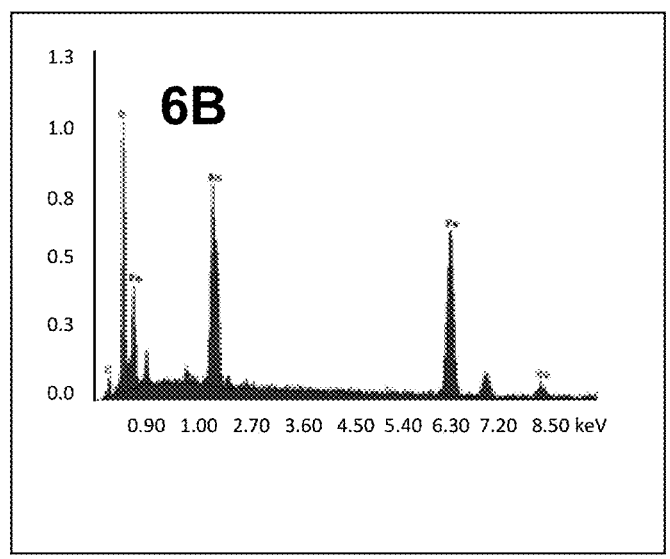

CENTRIFUGATION-ASSISTED PREPARATION OF ADDITIVE-FREE CARBON-DECORATED MAGNETITE ELECTRODES

RELATED APPLICATIONS

The present patent document claims the benefit of the filing date under 35 U.S.C. § 119(e) of Provisional U.S. Patent Application Ser. No. 62/065,274, entitled "Centrifugation-Assisted Preparation of Additive Free Carbon Doped Magnetite Electrodes," filed Oct. 17, 2014, which is hereby incorporated by reference.

BACKGROUND

Rechargeable lithium-ion batteries (LIBs) have been attracting much attention in the past few decades. LIBs with high power and energy density are highly desirable in order to meet the increasing demand for energy storage, in particular, electric vehicles. Currently, LIBs exclusively use carbon as negative-electrode materials for its good cycling performance based on the intercalation/de-intercalation mechanism of Li storage. However, the theoretical capacity of graphite at 372 mA h $g^{-1}$ (based on LiC6) has almost been achieved.

On the other hand, the intercalation of lithium into graphite mainly occurs at low potential close to zero V (vs. Li/Li+). Accidental overcharge at high currents may lead to the possible formation of lithium dendrites that short circuit anode and cathode and cause thermal runaway or even a fire. Recently, much attention has been devoted to the development of carbon-alternative negative-electrode materials, which must have higher specific capacity and better safety performance than the widely adopted carbon anode.

Various metal oxides have been extensively explored as carbon-alternatives, in particular, magnetite $Fe_3O_4$. $Fe_3O_4$ has a theoretical capacity of 927 mA h $g^{-1}$ and its potential of lithium insertion based on the conversion-type mechanism is significantly higher compared to that of carbon. Other advantages are low cost, abundance, environmental friendliness, and especially the high electrical conductivity at room temperature of about $2.5 \times 10^2$ S $cm^{-1}$ among all metal oxides.

High electrical conductivity is rarely observed in other metal oxides investigated for application in LIBs (e.g. $\alpha$-$Fe_2O_3$ has an electrical conductivity of rv$10^{-4}$ S $cm^{-1}$, which is six orders of magnitude or $\times 10^{-6}$ lower than magnetite). High conductivity is highly desirable for electrodes in LIBs to facilitate charge transfer. However, as one of the conversion-type negative-electrode materials, the volume expansion (~200%) of magnetite is much larger than that of insertion-type negative-electrode materials (such graphite) upon lithium insertion. This huge volume variation or pulverization could cause disintegration of the electrode and lead to poor cycling performance.

This poor cyclability becomes one of the obstacles to commercialize $Fe_3O_4$ as negative-electrode materials in LIBs. On the other hand, based on the conversion-type lithium storage mechanism, metallic iron ($Fe^0$) nanograins will be generated through electrochemical reduction. $Fe^0$ nanograins are highly reactive toward the organic electrolyte. The irreversible reactions on the surface of $Fe^0$ nanograins with the electrolyte could also cause poor cycling performance. To address the poor cycling performance of $Fe_3O_4$, one strategy is to adopt nanoscale materials to buffer the volume variation during the charge-discharge process. The other strategy is to add or coat with carbon to minimize the exposure between $Fe^0$ nanograins and organic electrolyte as well as to increase the electrical conductivity. For example, $Fe_3O_4$-carbon composites have been demonstrated to achieve a certain level of success in terms of electrochemical performances. The composites include $Fe_3O_4$-carbon nanospindles, $Fe_3O_4$-carbon nanorings, and C-encapsulated $Fe_3O_4$ nanoparticles homogeneously embedded in porous graphitic carbon nanosheets. Also reported have been a series of nanostructured iron oxide based anode materials for LIBs, such as carbon coated $Fe_2O_3$ nanorods, nanocubes, microboxes, nanotubes, nanodiscs, nanospheres, hollow microspheres of $Fe_3O_4$, nanohorns on CNTs, and $Fe_3O_4$ nanospheres with carbon matrix. Therefore, $Fe_3O_4$ could find promising application as negative electrodes in LIBs.

Moreover, manufacturing processes for electrodes for LIBs currently take multiple steps including mixing, roll-coating, compressing, and drying and involve the use of organic chemicals, some of which can be toxic, as binders and solvents.

It has been a challenge to develop nanoparticles that allow for exploitation of the advantageous properties of iron compounds for use in lithium ion batteries, as well as methods for decreasing the complexity and time of manufacture for electrodes.

BRIEF SUMMARY

In one embodiment, the disclosure provides an electrode for a lithium ion battery. The electrode includes a metal current collector having a first face and a second face opposite the first face; and a nanoparticle comprising an iron oxide compound and carbon, the nanoparticle being disposed on the first face of the metal current collector. The nanoparticles may be porous rather than solid.

In another embodiment, this disclosure provides a method of making a nanoparticle. The method includes combining an iron source with a carbon source in an aqueous solution defining an iron-carbon solution; combining the iron-carbon solution with a porosity-increasing compound and an alcohol to create a mixture; and heating the mixture at a predetermined temperature for a predetermined amount of time to form a nanoparticle.

In another embodiment, the present disclosure provides a nanoparticle comprising a porous composite of $\alpha$-$Fe_2O_3$ and carbon, the nanoparticle having a substantially ellipsoid structure.

The invention will be further described, in non-limiting fashion, in the detailed description below and in the accompanying drawings.

BRIEF DESCRIPTION OF THE DRAWINGS

FIG. 6A is a graphical representation of a thermogravimetric analysis (TGA) profile of carbon-decorated $Fe_3O_4$ nanoparticles in air to reveal the content of carbon and magnetite;

FIG. 6B is an EDS analysis of carbon-decorated $Fe_3O_4$ nanoparticles;

DETAILED DESCRIPTION OF THE DRAWINGS AND THE PRESENTLY PREFERRED EMBODIMENTS

Figure 1:
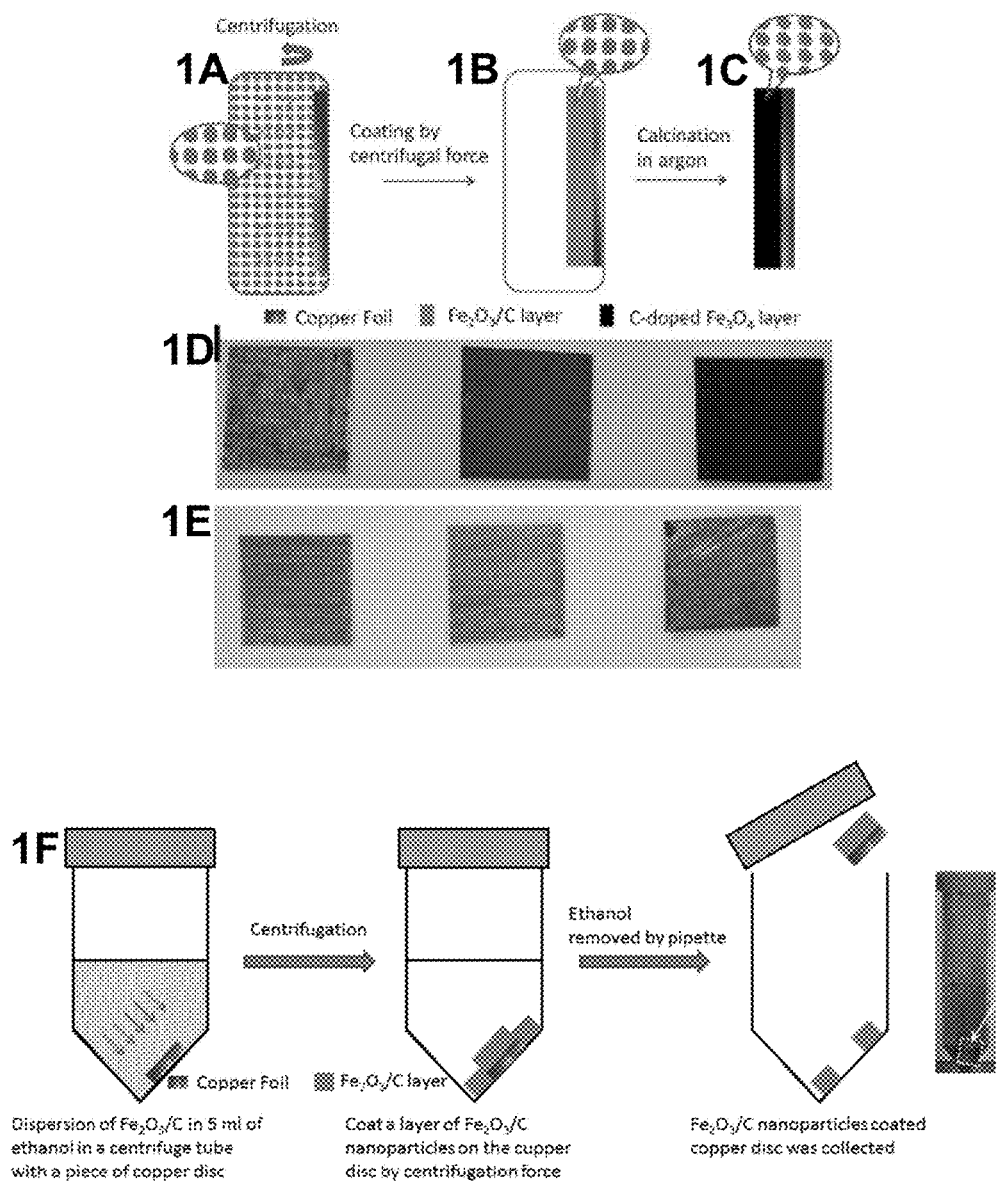
FIG. 1A is a schematic representation of a step of a centrifugation-assisted process (CAP) for making an additive-free electrode.
FIG. 1B is a schematic representation of another step of a centrifugation-assisted process for making an additive-free electrode.
FIG. 1C is a schematic representation of another step of a centrifugation-assisted process for making an additive-free electrode.
FIG. 1D is a view of the first faces of current collectors mentioned in the procedures of FIGS. 1A-1C.
FIG. 1E is a view of the second faces opposite the first faces of the current collectors of FIG. 1D.
FIG. 1F is a schematic representation of a centrifugation-assisted process for making an additive-free electrode.

As used herein with regard to a range, the term "between" is inclusive of the endpoints of said range, unless it is clear that the endpoints are excluded. For example, when "an integer between 1 and 3" is recited, the integer may have a value of 1, or of 2, or of 3.

As used herein, the terms "substantially" and "about" mean "approximately but not necessarily equal to," and when used in the context of a numerical value or range set forth means a variation of ±20%, or less, of the numerical value. For example, a value differing by ±20%, ±15%, ±10%, or ±5%, or any value in the range between −20% and +20%, would satisfy the definition of "substantially" or "about."

In one embodiment, the present disclosure provides a procedure to prepare porous olive-like carbon decorated $Fe_3O_4$ based additive-free electrodes with improved electrochemical performances. The porous $Fe_2O_3/C$ nanoparticle with olive-like particles obtained via ultrafast (about 75 minutes) one-pot synthesis was constructed by aggregation of short nanorods with a length of about 18 nm and a width of about 8 nm.

A centrifugation-assisted deposition (CAD) method was developed to prepare additive-free carbon decorated $Fe_3O_4$ where active materials were directly prepared on the current collector. In other words, once the synthesis of active materials finished, the electrodes were ready. No binder, conductivity enhancer or solvent was employed. The electrodes can be directly assembled into cells without any post-synthesis processing. In contrast, traditional electrode preparation involves multiple steps of slurry preparation (mixing), roll-coating, compressing, drying in a vacuum, and additives (for example, polyvinylidene fluoride PVDF binder, carbon black conductivity enhancer, and N-methylpyrrolidone NMP solvent) are employed in the process, in addition to the conventional procedures to prepare the active electrode materials. The as-prepared additive-free porous carbon decorated $Fe_3O_4$ based electrodes exhibited superior electrochemical performances in LIBs. A specific capacity of over about 750 mA h $g^{-1}$, particularly about 800 mA h $g^{-1}$ could be maintained for at least 240 cycles with minimum capacity fading. Moreover, it exhibited excellent rate performance: specific capacities of 761, 752, and 727 mA h $g^{-1}$ were achieved at high currents of 500, 1000 and 1500 mA $g^{-1}$, respectively. The results suggest that the additive-free carbon decorated $Fe_3O_4$ based electrode obtained by CAD can be potentially used in high-rate LIBs.

Disclosed herein is a facile procedure to prepare a novel additive-free carbon-decorated magnetite ($Fe_3O_4$) electrode with unique nanostructure, inclusive of a substantially ellipsoid or olive-like structure, for application in next-generation high-energy lithium-ion batteries. It includes an ultrafast solvothermal process to prepare a composite of porous $\alpha$-$Fe_2O_3$ and carbon with a unique olive-like (or substantially ellipsoid) nanostructure formed by aggregations of orderly aligned nanorods as building subunits as the precursor; a novel facile centrifugation-assisted preparation of additive-free electrode; in situ carbothermic partial reduction of $\alpha$-$Fe_2O_3$ to carbon-decorated $Fe_3O_4$ as additive-free electrode by a heating (or sintering, or calcination) process in argon; and superior performances in lithium storage for advanced lithium-ion batteries have been successfully demonstrated.

A fast solvothermal method allows for preparation of porous $\alpha$-$Fe_2O_3$-carbon composite with unique olive-like (or substantially ellipsoid) structures formed by aggregation of orderly-aligned nanorods. The $\alpha$-$Fe_2O_3$-carbon nanocomposite can be prepared in a water/alcohol mixture in a reaction time of only 75 minutes, instead of more than 24 hours which is normally used in solvothermal/hydrothermal synthesis widely reported in literature. The as-prepared porous $\alpha$-$Fe_2O_3$-carbon nanomaterials can be directly coated on a current collector, such as a metal, in particular a copper disc.

A simple and fast centrifugation-assisted method (CAM) allows for preparation of additive-free electrodes used for lithium ion batteries. The additive-free $\alpha$-$Fe_2O_3$-carbon electrode can be simply prepared in 5 min by centrifuging copper disc current collector in ethanol solution of $\alpha$-$Fe_2O_3$-carbon nanomaterials. The as-prepared porous $\alpha$-$Fe_2O_3$-carbon nanomaterials can be selectively uniformly coated on one side of the copper disc current collector directly by the centrifugation of copper disc in ethanol solution of $\alpha$-$Fe_2O_3$-carbon nanomaterials, without any additives (e.g. PVDF binder, carbon black conductivity enhancer and NMP solvent). This represents a contrast to conventional electrode preparation. The existing traditional technology to prepare electrode involves multiple steps, including slurry preparation, coating, compressing, and drying in vacuum. Also, additives are used to prepare the traditional electrode. Organic polymer additive used as binder is mixed with conductive carbon black additive as conductive enhancer in toxic NMP solvent to coat the as-prepared active material on current collector.

The in situ carbothermic partial reduction of $\alpha$-$Fe_2O_3$-carbon additive-free electrode to carbon-decorated $Fe_3O_4$ additive-free electrode is achieved by heating (or calcining, or sintering) $\alpha$-$Fe_2O_3$-carbon additive-free electrode in argon in tube furnace. The $\alpha$-$Fe_2O_3$-carbon electrode can be selectively reduced to carbon-decorated $Fe_3O_4$ electrode by a simple heating (or sintering, or calcination) process with the coating of materials firmly attached on the copper current collector.

The additive-free carbon-decorated magnetite electrodes have superior electrochemical performance when compared to those made by conventional methods. The specific capacity can be maintained at about greater than 750 mAh $g^{-1}$, or about 800 mAh $g^{-1}$, after more than 240 cycles at current of 100 mA $g^{-1}$. Further, no significant capacity drop is observed when the electrode is charged/discharged at a much higher current of about 1500 mA g−1 (or about 730 mA h $g^{-1}$). As compared to the graphitic carbon anode materials in commercial LIBs which have theoretical specific capacity of 372 mA h $g^{-1}$, a huge improvement in electrochemical performance is realized with these electrodes. The magnetite nanoparticles may be porous nanoparticles.

The ultrafast solvothermal method allows for preparation of $\alpha$-$Fe_2O_3$-carbon nanomaterials in a water-alcohol system. Even though the solvothermal methods are widely applied to prepare nanomaterials, a relatively long reaction time (e.g. 24 hours or longer) is always required to obtain the materials. Here the preparation can be achieved in only about 75 minutes, which shorten the time of preparation significantly. This solvothermal process was used here to prepare active materials in a short time, which is more desirable in industry production; prepare $\alpha$-$Fe_2O_3$-carbon nanomaterials, precursors of carbon-decorated magnetite, which can be directly coated on copper current collector and is essential to prepare the additive-free electrode Contrarily, in a conventional electrode preparation, four steps are required to prepare additive-contained electrode, including (1) weighing and mixing of active materials and additives (e.g., PVDF binder, carbon black conductivity enhancer and NMP solvent), and preparation of slurry through grinding the mixture, (2) coating, (3) compressing and (4) drying processes. The polymer binder polyvinylidene fluoride (PVDF) is an adhesive and traditionally used as binder to coat active materials on current collector. However, a relatively long period and vacuum is required to dry the binder-contained electrode, normally more than 12 hours at 120° C. in vacuum, due to the high boiling point of NMP solvent (202-204° C.). In the process to prepare additive-free carbon-decorated magnetite electrode, only two steps are required, including a centrifugation step to deposit of α-Fe$_2$O$_3$-carbon nanomaterials on current collector and a heating (or sintering, or calcination) step to convert α-Fe$_2$O$_3$-carbon to carbon-decorated magnetite. The centrifugation and heating (or sintering, or calcination) processes take 5 minutes and 220 minutes, respectively. No additives are required, so vacuum conditions and drying time of 12 or more hours is not required, which simplifies industrial production and saves money.

The in situ carbothermic partial reduction of α-Fe$_2$O$_3$-carbon additive-free electrode to carbon-decorated Fe$_3$O$_4$ additive free electrode through a heating (or sintering, or calcination) process in argon: α-Fe$_2$O$_3$-carbon additive-free electrodes can be selectively reduced to carbon-decorated Fe$_3$O$_4$ electrode by a simple heating (or calcination, or sintering) process in argon, while the copper discs as current collector are stable and inert in the reaction to convert α-Fe$_2$O$_3$ to Fe$_3$O$_4$. The carbon-decorated Fe$_3$O$_4$ was firmly and uniformly attached on copper current collector to form additive-free electrode and a superior cycling performance and rate performance were achieved in LIBs.

The present disclosure provides for preparation of suitable nanostructured carbon decorated Fe$_3$O$_4$ for LIB applications, simplified electrode preparation technology, shortened electrode preparation time, and excellent electrochemical performances in lithium ion batteries.

The procedure to prepare additive-free carbon-decorated magnetite based electrodes, including active materials preparation and electrode preparation, could find applications in lithium ion batteries for energy storage. Making electrodes for lithium ion batteries will in turn proceed at lower cost. Fabrication is simplified and superior electrochemical performances are realized. These materials can be used as anode materials for lithium ion batteries and achieve superior performance at reduced cost.

It is rarely reported that the power materials can be directly and uniformly coated on current collector. Here, the ultrafast solvothermal method is used to prepare α-Fe$_2$O$_3$-carbon nanoparticle, which is in turn used to prepare the additive-free electrode. These α-Fe$_2$O$_3$-carbon nanoparticles can be easily coated on copper current collector through centrifugation.

Porous nanostructured olive-like (or substantially ellipsoid) carbon decorated Fe$_3$O$_4$ (Fe$_3$O$_4$/C) was prepared via in situ carbothermal treatment of the porous olive-like composite of α-Fe$_2$O$_3$-carbon. The precursor porous olive-like (or substantially ellipsoid) α-Fe$_2$O$_3$-carbon nanoparticles are prepared through an ultrafast (75 minutes) one-pot solvothermal method. The porous olive-like Fe$_3$O$_4$/C nanostructures are formed by joined (interconnected) nanorods, and its precursor α-Fe$_2$O$_3$-carbon nanostructures, are formed by aggregation of orderly-aligned nanorods as building subunits. The successful conversion from α-Fe$_2$O$_3$-carbon to Fe$_3$O$_4$/C by in situ carbothermic partial reduction is evidenced by extensive characterization, as shown in the drawings and in the description below.

The porous olive-like α-Fe$_2$O$_3$-carbon nanoparticles dispersed in ethanol are coated on Cu current collectors by centrifugation-assisted deposition (CAD) directly without any additives employed and subsequently heated to convert to a Fe$_3$O$_4$/C coated current collector, such as a copper disc, which can be used as an electrode without any further processing. In contrast, traditional electrode preparation involves multiple steps of slurry preparation, coating, compressing, drying in a vacuum and additives (e.g., PVDF binder, carbon black conductivity enhancer and NMP solvent) are employed in the process.

The as-prepared additive-free, porous, Fe$_3$O$_4$/C based electrode constructed from nanoparticles having both iron and carbon within the nanoparticle exhibited superior electrochemical performances in lithium storage. Excellent cycling performance was achieved with a specific capacity at >800 mA h g$^{-1}$ for at least 240 cycles. Impressive rate performance was accomplished when tested under different currents: no significant capacity drop was observed when current was increased from 100 mA g$^{-1}$ to 1500 mA g$^{-1}$ and a specific capacity of 730 mA h g$^{-1}$ could be maintained at current of 1500 mA g$^{-1}$. The electrode in this embodiment did not include a magnetite nanoparticle that was coated with carbon, but rather a nanoparticle that contained both magnetite and carbon in a single particle.

In a typical synthesis, an iron source is combined with a carbon source in an aqueous solution to define an iron-carbon solution. In one embodiment, about 0.4 mmol of FeCl$_3$.6H$_2$O and about 0.4 mmol of D-glucose were fully dissolved in 16 ml of deionized water. Many different iron compounds may be used, as may many different carbon sources. Particularly useful are iron halides, such as iron fluorides, iron chlorides, iron bromides, and so forth.

Continuing with the exemplary embodiment, a porosity-increasing and structure-controlling compound is added. Without such a compound, the structure of the nanoparticle is solid, and has a different morphology (that is, the particle is no longer olive-like in structure.) In one embodiment, the porosity-increasing compound may be an anion or provide anions to the mixture. In one embodiment, the anion has a charge of −2. In one embodiment, the porosity-increasing compound is dimethyl oxalate. In the exemplary embodiment, about 0.4 mmol of dimethyl oxalate was fully dissolved in about 16 milliliters (ml) of 1-propanol. The former solution was added drop by drop to the later solution. The mixture was stirred for about 15 minutes, and then transferred into a 45 ml Teflon-lined autoclave and heated at 200° C. for about 75 minutes. Further variations may be used, such as a heating temperature range of about 160° C. to about 225° C., and a time of about 45 minutes to about 120 minutes. The solid products are collected and washed repeatedly with water and ethanol, and dried at about 80° C. in a vacuum oven overnight. This gives rise to a collection of olive-like (or substantially ellipsoid) iron-carbon nanoparticles.

Figure 4:
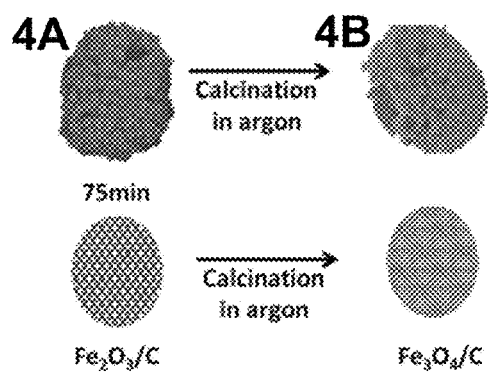
FIG. 4A is a schematic illustration of change in composition of nanoparticles between $Fe_2O_3/C$ to carbon-decorated $Fe_3O_4$ in accordance with another embodiment of the present invention.
FIG. 4B is a schematic illustration of change in composition of nanoparticles between $Fe_2O_3/C$ to carbon-decorated $Fe_3O_4$ in accordance with another embodiment of the present invention.

The process of generating an electrode using said nanoparticles is illustrated in FIG. 1F, and in FIGS. 1A-1B. In one embodiment, a calculated amount of olive-like Fe$_2$O$_3$/C powders is dispersed into about 5 ml of ethanol in a 50 ml centrifuge tube under ultrasonication to achieve a highly homogeneous suspension. A current collector, such as for example a piece of clean copper disc typically used as a current collector, is placed into the centrifuge tube and was centrifuged together with the mixture solution at about 6000 rpm for about 5 min. The olive-like (or substantially ellipsoid) α-Fe$_2$O$_3$-carbon nanoparticles were deposited by centrifugal force and coated firmly on only one side of the copper disc (see for example FIG. 1D, middle image). Centrifuging in this manner selectively coats a single face of the current collector (see FIG. 1E) which is a desirable outcome. The olive-like Fe$_2$O$_3$-carbon coated copper disc is dried in a vacuum oven at 80° C. overnight, which could be further modified to a significantly shorter time due to the easy evaporation of ethanol solvent. To prepare an olive-like (or substantially ellipsoid) carbon decorated Fe$_3$O$_4$ based electrode, the coated copper disc was heated (or sintered, or calcined) in a tube furnace at a heating rate of about 6° C. per minute to a final temperature of about 600° C. and maintained at a predetermined sintering temperature for a predetermined time of about 2 hours under argon (see FIG. 1C, FIG. 4A-4B).

Particles made according to the above protocol and generally in accordance with the principles of the present disclosure stick to a wide variety of surfaces: metals, glass, plastics, and so forth. Without wishing to be bound by any particular theory, this intrinsic stickiness may be due to functional groups on the carbons or the iron of the nanoparticle, or from decomposition of glucose, or the nanostructure that makes up the particle. Theory notwithstanding, this property of the composition is notable, as it allows for binding between the nanoparticle and the current collector with no binder, and no additive. Stated another way, the electrode is made by direct binding (or attachment) of the nanoparticle to a face of a current collector. This direct binding is made possible by properties particular to the nanoparticles disclosed herein, and is distinct from protocols and assemblies wherein a binder is used to affix nanoparticles to a surface. The elimination of binder can allow for a greater quantity, in some embodiments as measured by surface area, in other embodiments as measured by volume, of the active material which is made up of nanoparticles, rather than some of this surface area or volume being occupied by the binder or another additive.

Without being bound by any theory, a porous nanoparticle, rather than a solid nanoparticle, may have certain advantages. For instance, the porosity may increase infiltration of the electrolyte of a LIB into the electrode, providing greater interaction between these two components.

Furthermore, nanoparticles formed in this way constitute a type of nanoparticle which has both carbon and iron present at its surface. This stands in contrast to other types of nanoparticles which may be made of an iron-containing compound and which are coated with a layer of a carbon-containing compound after formation of the iron-based nanoparticle. As will be described below, these noncoated iron-carbon nanoparticles can be used in the construction of electrodes which have advantageous properties.

Powder X-ray diffraction (XRD) was carried out with a Rigaku Smartlab X-ray diffractometer using Cu K$^\alpha$ radiation ($\lambda$=0.15418 nm). The morphology of the materials was characterized by field emission scanning electron microscopy (JSM-7600 FE SEM, with an accelerating voltage of 15 kV) and by trans-mission electron microscopy (JEOL 2010 TEM instrument, with an accelerating voltage of 200 kV). See FIG. 2A. The energy-dispersive X-ray spectroscopy (EDS) was measured using Pegasus Apex 2 integrated EDS. See FIG. 2G. Thermal gravimetric analysis (TGA) was carried out with SDT Q600 (TA Instruments) under a dynamic air atmosphere with a ramping rate of 10° C. min$^{-1}$ to 900° C. See FIG. 6A, which shows TGA results of olive-like carbon-coated $Fe_3O_4$ in air.

The additive-free electrodes of olive-like (or substantially ellipsoid) carbon decorated $Fe_3O_4$ coated on a copper disc as obtained by CAP were assembled into testing cells directly. Electrochemical test cells were assembled in an argon-filled glove box using the additive-free electrode as the working electrode, metallic lithium foil as the counter and reference electrode, 1 Molar (M) solution of $LiPF_6$ in a 50:50 v/v mixture of ethylene carbonate (EC) and diethyl carbonate (DEC) as the electrolyte, and PP/PE/PP trilayer membranes (Celgard 2320) as the separator. The cells were charged and discharged galvanostatically at room temperature in the voltage window of 0.01-3 V at different currents on a MTI BST8-WA battery tester.

Figure 2:
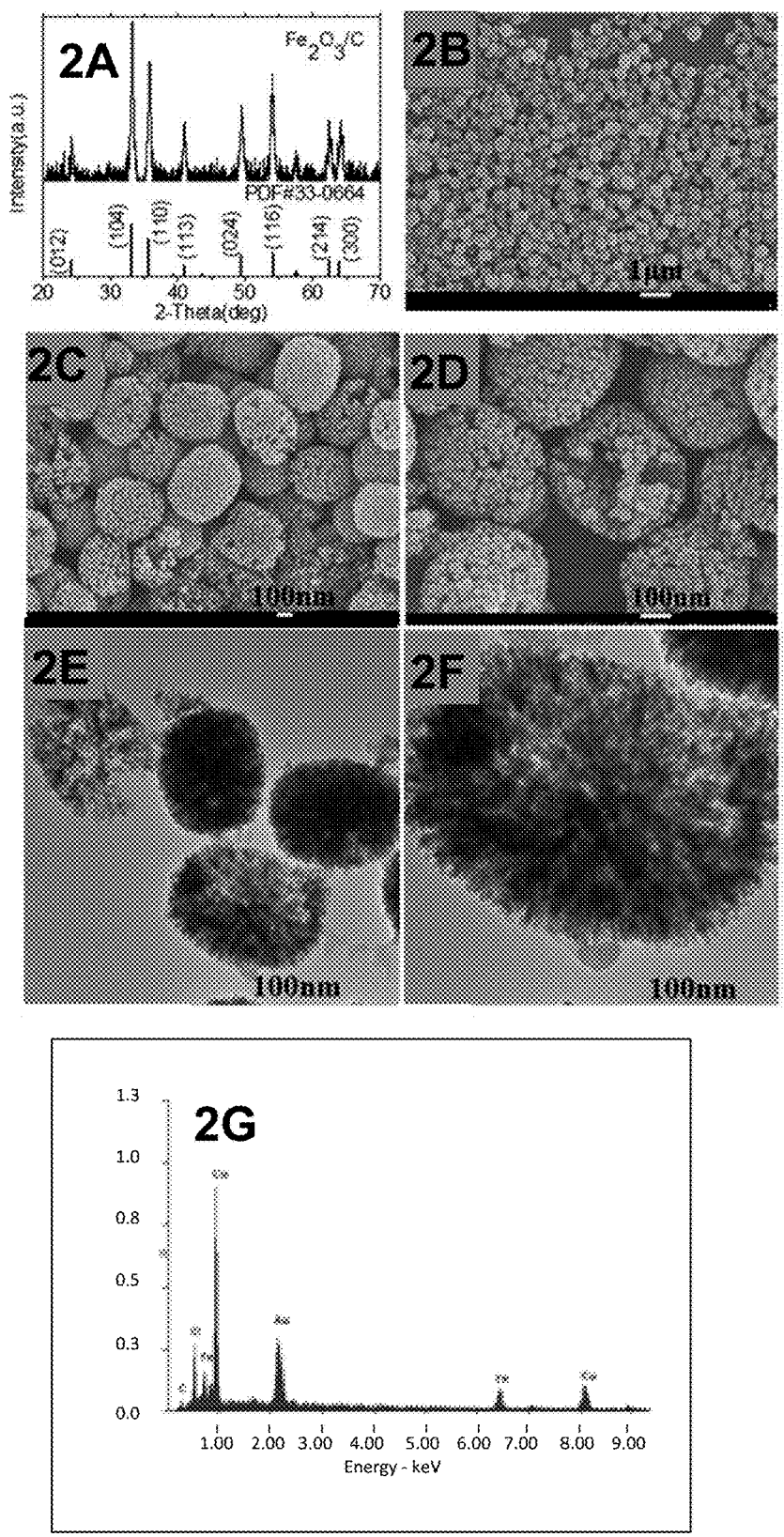
FIG. 2A is an x-ray diffraction (XRD) pattern characterizing an olive-like porous $Fe_2O_3/C$ nanoparticle.
FIG. 2B is a field emission scanning electron microscope (FESEM) image of $Fe_2O_3/C$ nanoparticles.
FIG. 2C is a field emission scanning electron microscope (FESEM) image of $Fe_2O_3/C$ nanoparticles.
FIG. 2D is a field emission scanning electron microscope (FESEM) image of $Fe_2O_3/C$ nanoparticles.
FIG. 2E is a transmission electron microscopy (TEM) image of $Fe_2O_3/C$ nanoparticles.
FIG. 2F is a transmission electron microscopy (TEM) image of $Fe_2O_3/C$ nanoparticles.
FIG. 2G is an energy-dispersive X-ray spectroscopy (EDS) analysis of an olive-like $Fe_2O_3/C$ nanoparticle.

The overall preparation process of porous olive-like $\alpha$-$Fe_2O_3$-carbon nanoparticles as precursors was achieved by 75 min of solvothermal reaction, in one embodiment in a sealed Teflon reactor in stainless steel autoclave. The as-obtained products are shown in FIGS. 2B and 2C. Porous olive-like carbon decorated $Fe_3O_4$ nanoparticles with rough surfaces were obtained by heating (or sintering, or calcining) the porous olive-like $\alpha$-$Fe_2O_3$-carbon precursor under the protection of argon. Without wishing to be bound by any particular theory, the carbon inside the olive-like $Fe_2O_3$-carbon nanoparticles likely played a role to partially reduce $Fe_2O_3$ to $Fe_3O_4$ during heating (or sintering, or calcination) of porous olive-like $\alpha$-$Fe_2O_3$-carbon due to carbothermic reactions.

Porous olive-like $Fe_2O_3$-carbon nanoparticles, the precursor for making carbon decorated $Fe_3O_4$, were prepared through a fast solvothermal reaction with a reaction time of only 75 min and characterized by XRD, FESEM and TEM (FIG. 2A-2F, 3A-3F). The XRD pattern of the as-prepared nanoparticle can be indexed to $\alpha$-$Fe_2O_3$ with rhombohedral structure (JCPDS card no. 33-0664) and no impurities are detected in the pattern (FIG. 2A). The crystalline size calculated from the Scherrer equation based on (110) peaks is 18 nm, which is in accordance with the size of building subunits of the porous nanoparticles observed under FESEM (FIG. 2D) and TEM (FIG. 2F). The absence of carbon peaks suggests that the carbon from hydrothermally carbonized glucose is mainly amorphous. The carbon of the nanoparticles of the present disclosure is dispersed; there is not a large clustering which includes high-carbon regions as though the composite had been prepared by a different method, such as by inclusion of carbon quantum dots.

The EDS (FIG. 2G) exhibits that the as-prepared particles contain the elements of carbon, iron and oxygen as expected. Carbon was produced through the carbonization of glucose during the solvothermal process above 160° C. The typical morphology and structure of the olive-like (or substantially ellipsoid) $Fe_2O_3$-carbon nanoparticles are clearly revealed by the FESEM images (FIG. 2B-2D). The overall morphology and size distribution of the olive-like $Fe_2O_3$-carbon nanoparticles are revealed by the low-magnification FESEM image (FIG. 2B). The aspect ratio of the olive-like structure is around 3:2, as shown in the high-magnification image (FIG. 2C).

The olive-like $\alpha$-$Fe_2O_3$-carbon nanoparticles are about 300-600 nm in length and about 200-400 nm in diameter. More details of the internal structure of the nanoparticle are shown in the zoom-in view FESEM image (FIG. 2D): the olive-like nanoparticle is formed by aggregation of ordered small nanorods with a length of about 18 nm and a width of about 8 nm (which was further confirmed by TEM). A broken olive-like structure at the center of the high-magnification FESEM image shows that the whole structure is highly porous, from the core to the surface. The structure of the $\alpha$-$Fe_2O_3$-carbon composite is further revealed by the TEM characterization (FIG. 2E and FIG. 2F).

Figure 3:
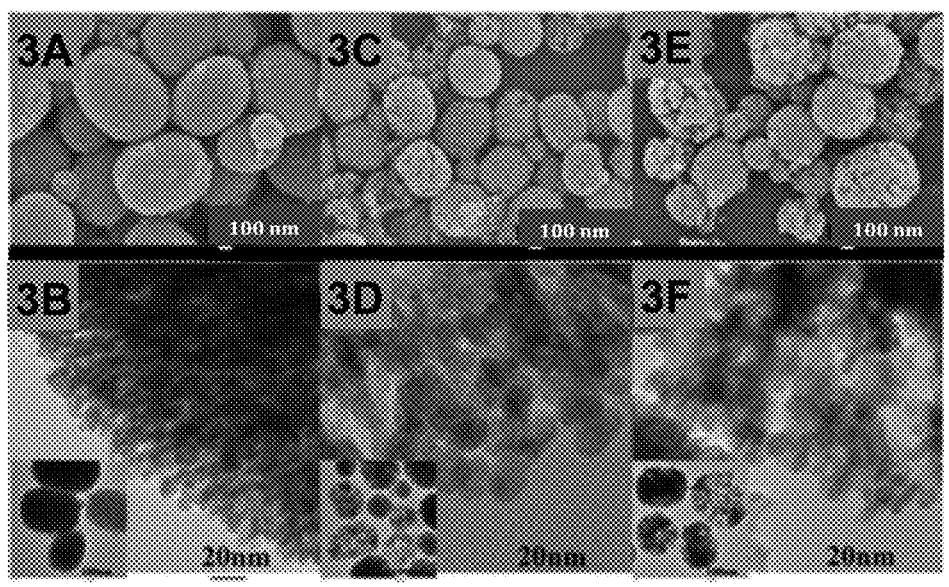
FIG. 3A is a FESEM image of porous $Fe_2O_3/C$ nanoparticles in accordance with another embodiment of the present disclosure.
FIG. 3B is a FESEM image of porous $Fe_2O_3/C$ nanoparticles in accordance with another embodiment of the present disclosure.
FIG. 3C is a FESEM image of porous $Fe_2O_3/C$ nanoparticles in accordance with another embodiment of the present disclosure.
FIG. 3D is a FESEM image of porous $Fe_2O_3/C$ nanoparticles in accordance with another embodiment of the present disclosure.
FIG. 3E is a FESEM image of porous $Fe_2O_3/C$ nanoparticles in accordance with another embodiment of the present disclosure.
FIG. 3F is a FESEM image of porous $Fe_2O_3/C$ nanoparticles in accordance with another embodiment of the present disclosure.

A set of experiments were carried out to study the effect of reaction times on the structure of the olive-like $Fe_2O_3$-carbon precursors. Those nanoparticles obtained at different reaction times were characterized by FESEM and TEM (FIG. 3A-3F). When the reaction time was about 45 minutes, less porous olive-like nanoparticles were formed (FIGS. 3A-3B, and the inset of 3B). The nanorod subunits, with the length and width of around 18 and about 8 nm, respectively, were aggregated to form the olive-like structure and closely packed (FIG. 3B). All the subunits of nanorods are well aligned in the same way, radiating from the core to the outside, as shown in FIG. 3B. As the reaction time increased from 45 minutes to 75 minutes, the olive-like structure became more porous, as evidenced by the more distinguishable gaps between fat nanorod subunits in FIGS. 3C and 3D. The inset of FIG. 3D reveals that the whole olive-like structure is porous, which is consistent with the broken olive-like structure observed in the high magnification FESEM image (FIG. 2D).

As the reaction time further increased to 3 hours, the porous nature was preserved, as shown in FIG. 3E and the inset of FIG. 3F. However, with a longer reaction time, the length and diameter of the nanorod subunits increase to about 23 nm and about 10 nm, respectively. Also, the orientations of the subunits become more random, as compared to the samples prepared with shorter reaction times of 45 minutes and about 75 minutes. Besides the reaction time, the porosity and the shape of the as-prepared olive-like structure can be affected by the amount of glucose. With 0.4 mmol or 0.2 mmol glucose, the olive-like (or substantially ellipsoid) structures are highly porous with the nanorods as the basic building units. Occasionally, by-products of hollow nanoparticles were also observed. For comparison, with only 0.1 mmol glucose, the porosity of the olive-like structure is less than those obtained with 0.4 mmol or 0.2 mmol of glucose. A tunnel which connects the two ends of the olive-like structure and two open ends, instead of the highly porous structure was observed. We observed that the aspect ratio of the as prepared olive-like nanoparticles could be tuned through the control of the amount of glucose. The aspect ratio increases from about 3:2 to about 2:1 when the amount of glucose added is decreased from 0.4 mmol to 0.1 mmol. Without any glucose, a cocoon-like hollow structure with an aspect ratio of about 2.5:1 could be achieved.

Based on the experimental observation, a plausible formation mechanism is proposed. The formation of porous olive-like nanoparticles starts from the hydrolysis of $Fe^{3+}$ ions and nucleation in solution and the subsequent formation of nanorods. The nanorods as building units aggregate to form an olive-like structure and the nanorods are densely packed initially (FIG. 3A). The highly porous olive-like aggregates form with a longer reaction time (FIG. 3B). The small nanorod subunits, which possess higher surface energy in solution, tend to be dissolved more easily to minimize the total surface energy. Thus, the big nanorods grow with the continuous dissolving of small subunits and re-deposition on large subunits. With the decrease of the number of small nanorods and the increase of the size of the large nanorods, void spaces are generated and the particles become porous. Meanwhile, the aspect ratio and the porosity can be tuned through the control of glucose. It might be because the glucose or the deposited carbon may influence the surface property of the nanorod subunits and their aggregation. Thus, the orientated alignment of the subunits could be different from those in the system without glucose.

Figure 5:
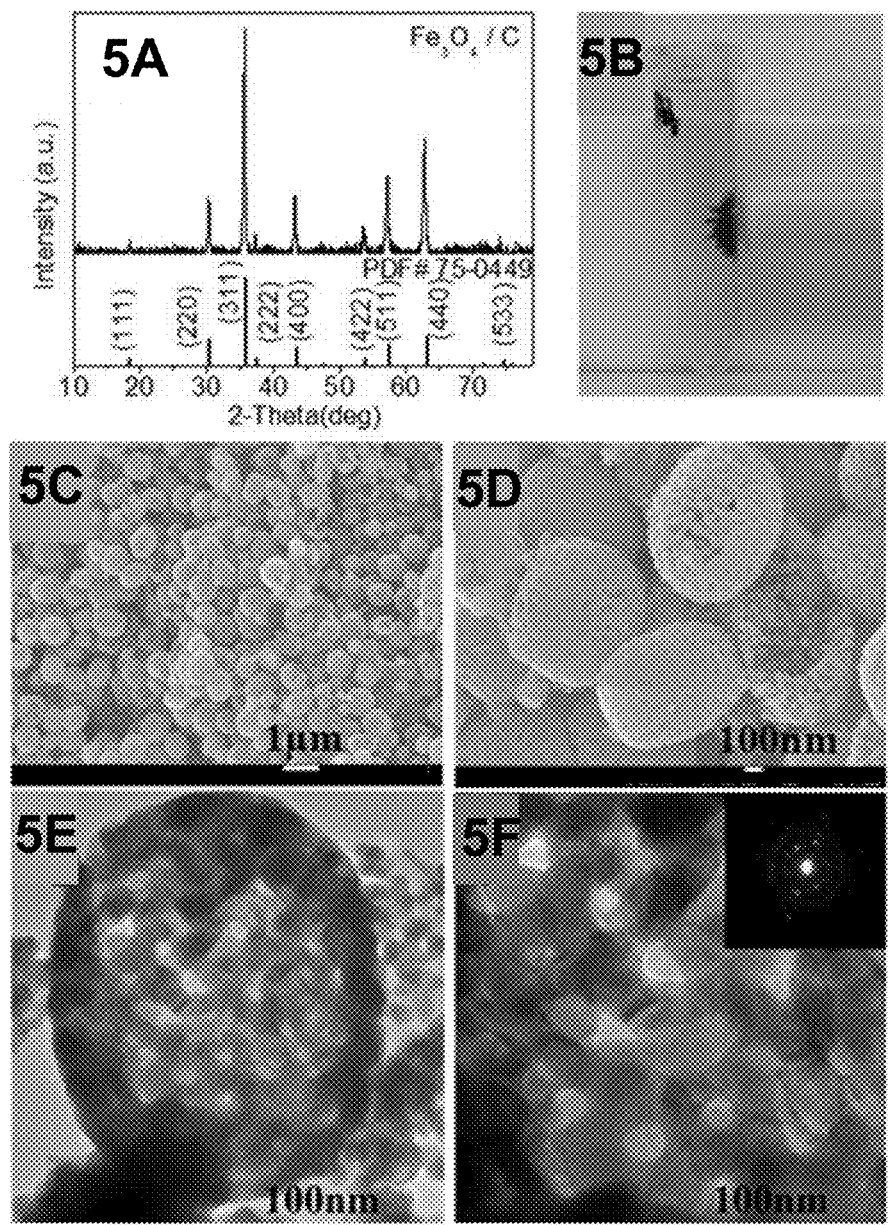
FIG. 5A is an XRD pattern characterizing a carbon-decorated $Fe_3O_4$ nanoparticle.
FIG. 5B is a photograph of carbon-decorated $Fe_3O_4$ nanoparticles with magnetic properties in a tube.
FIG. 5C is a FESEM image of carbon-decorated porous $Fe_3O_4$ nanoparticles in accordance with another embodiment of the present disclosure.
FIG. 5D is a FESEM image of carbon-decorated porous $Fe_3O_4$ nanoparticles in accordance with another embodiment of the present disclosure.
FIG. 5E is a TEM image of carbon-decorated $Fe_3O_4$ nanoparticles in accordance with another embodiment of the present disclosure.
FIG. 5F is a TEM image of carbon-decorated $Fe_3O_4$ nanoparticles in accordance with another embodiment of the present disclosure.

The as-prepared olive-like $Fe_2O_3$-carbon could be converted to carbon decorated $Fe_3O_4$ preserving the overall morphology well. The successful partial reduction of $Fe_2O_3$ was proved by the evidence that $Fe_3O_4$ was produced as revealed by XRD (FIG. 5A). All the peaks of the XRD pattern can be assigned to $Fe_3O_4$ (JCPDS card no. 75-0449), and no peak of a-$Fe_2O_3$ is observed, suggesting that carbothermic conversion of $Fe_2O_3$ into $Fe_3O_4$ was successful and complete. The crystalline sizes of as prepared $Fe_3O_4$ are about 45 nm, calculated based on the (220) peak, which is significantly larger than the crystallite size of the $Fe_2O_3$ nanoparticle at around 20 nm. The typical black color of $Fe_3O_4$ rather than the typical red color of $Fe_2O_3$, was obtained and all the black power of olive-like carbon decorated $Fe_3O_4$ attracted by a magnetic bar (FIG. 5B) demonstrate that $Fe_2O_3$ was successfully converted to $Fe_3O_4$. Note that the powder of carbon decorated $Fe_3O_4$ was obtained without being coated on the copper disc by CAP in this case and the nanoparticle powder was heat treated similarly under argon in a crucible. The conversion from $Fe_2O_3$ to $Fe_3O_4$ under inert gas also proves the existence of carbon produced by the solvothermal carbonization of glucose, which acts as the only reducing agent to convert $Fe_2O_3$ to $Fe_3O_4$.

The morphology of as-synthesized olive-like carbon decorated $Fe_3O_4$ was revealed by FESEM and TEM images in FIG. 5C-5F. After the heating to (or sintering at or calcination at) 600° C. under argon, the olive-like (or substantially ellipsoid) structure was maintained (FIG. 5C and FIG. 5D). The porosity of the olive-like carbon decorated $Fe_3O_4$ is also preserved, revealed by the broken olive-like structure in FIG. 5D. The size of subunits of carbon decorated $Fe_3O_4$ increased to around 50 nm from about 18 nm subunits in the $Fe_2O_3$-carbon nanoparticle (FIG. 5E and FIG. 5F), which is consistent with the sizes estimated from the XRD. The increase in size of subunits can be attributed to the high temperature annealing induced crystalline growth.

As compared to the $Fe_2O_3$-carbon aggregates assembled by aligned nanorods, carbon decorated $Fe_3O_4$ was constructed by joined subunits. The connection of building subunits may be attributed to the annealing process where subunits are joined by grain boundary diffusions which was also observed in the study of other metal oxide nanomaterials. It may also be attributed to the consumption of carbon in $Fe_2O_3$-carbon through the carbothermic reduction process which eliminates the impurities between grain boundaries. The SAED pattern (the inset of FIG. 5F) demonstrates that the olive-like carbon-decorated $Fe_3O_4$ is crystalline with all the diffraction spots assigned to $Fe_3O_4$.

The carbon content in the as-prepared $Fe_3O_4$/C materials is quantitatively determined by the TGA analysis (FIG. 6A). The small weight loss below 150° C. is due to the evaporation of the adsorbed moisture or gaseous molecules. The combustion of carbon begins at around 300° C. $Fe_3O_4$ can be oxidized to $Fe_2O_3$ when heated in air, and the theoretical weight increase is 3.45%, based on the chemical reaction $4Fe_3O_4+O_2 \rightarrow 6Fe_2O_3$. From TGA analysis, the carbon content of the carbon decorated $Fe_3O_4$ nanoparticle was estimated to be 0.43%.

Figure 7:
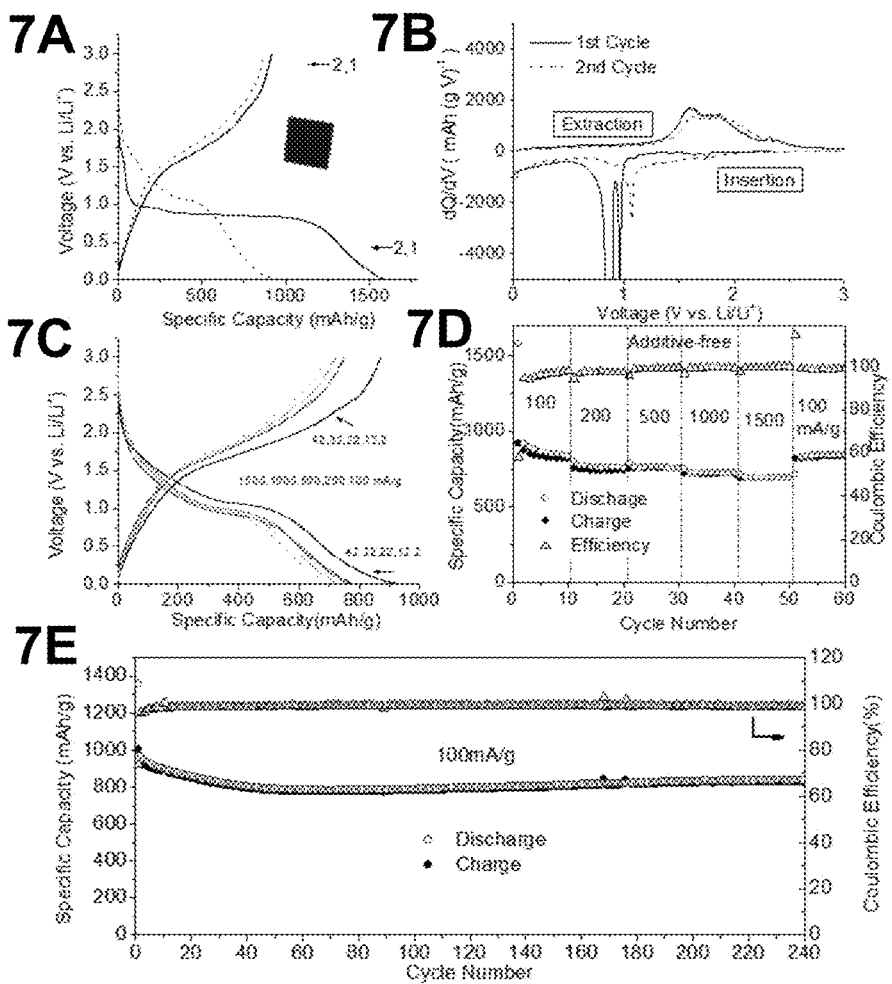
FIG. 7A is a graphical representation of an electrochemical measure of the performance of an additive-free electrode including carbon-decorated $Fe_3O_4$ nanoparticles formed by an additive-free centrifugation-assisted manufacturing process in accordance with another embodiment of the present invention.
FIG. 7B is a graphical representation of another electrochemical measure of the performance of an additive-free electrode including carbon-decorated $Fe_3O_4$ nanoparticles formed by an additive-free centrifugation-assisted manufacturing process in accordance with another embodiment of the present invention.
FIG. 7C is a graphical representation of another electrochemical measure of the performance of an additive-free electrode including carbon-decorated $Fe_3O_4$ nanoparticles formed by an additive-free centrifugation-assisted manufacturing process in accordance with another embodiment of the present invention.
FIG. 7D is a graphical representation of another electrochemical measure of the performance of an additive-free electrode including carbon-decorated $Fe_3O_4$ nanoparticles formed by an additive-free centrifugation-assisted manufacturing process in accordance with another embodiment of the present invention.
FIG. 7E is a graphical representation of another electrochemical measure of the performance of an additive-free electrode including carbon-decorated $Fe_3O_4$ nanoparticles formed by an additive-free centrifugation-assisted manufacturing process in accordance with another embodiment of the present invention.
Figure 9:
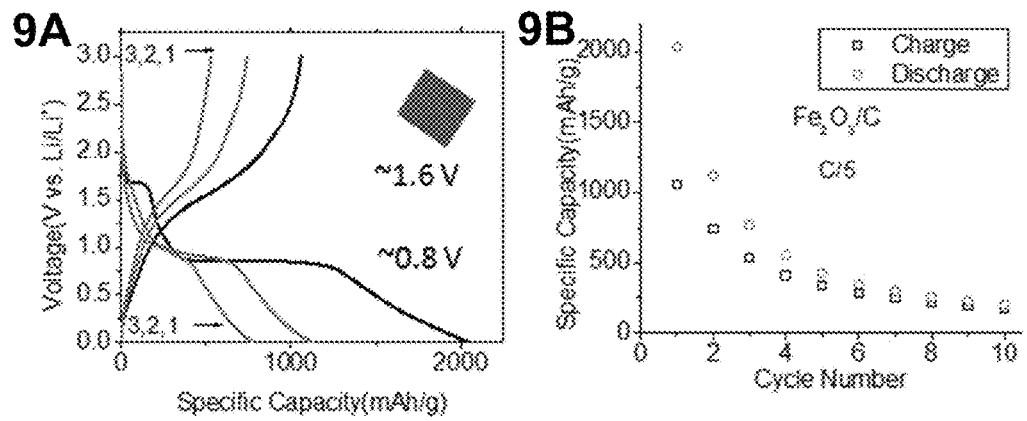
FIG. 9A is a graphical representation of an electrochemical measure of the performance of an additive-free electrode including α-$Fe_2O_3$-carbon composite nanoparticles formed by a centrifugation-assisted manufacturing process in accordance with another embodiment of the present invention and an inset image of said electrode.
FIG. 9B is a graphical representation of another electrochemical measure of the performance of an additive-free electrode including α-$Fe_2O_3$-carbon composite nanoparticles formed by a centrifugation-assisted manufacturing process in accordance with another embodiment of the present invention.

The as-prepared olive-like carbon decorated $Fe_3O_4$ nanoparticle fabricated directly on a current collector (in this case, a copper disc) was used as an additive-free ready electrode and assembled into a coin-type cell directly and evaluated. The electrochemical properties of the as-prepared additive-free $Fe_3O_4$/C electrode are shown in FIG. 7. An optical image of the additive-free carbon decorated $Fe_3O_4$ as a ready electrode for cell assembly is shown in the inset of FIG. 7A. The charge-discharge profiles of the first two cycles at the current of 100 mA $g^{-1}$ with a cutoff voltage window of 0.01-3.0 volts (V) are shown in FIG. 7A. In the first discharge curve, two potential plateaus at about 0.9 and 0.8 V are observed, which can be ascribed to the formation of a Li—Fe—O compound, the conversion reaction of the Li—Fe—O compound to $Fe^0$ and the formation of the $Li_2O$ matrix. This profile is different from the first cycle discharge profile of $Fe_2O_3$ negative-electrode materials, which has two potential plateaus at around 1.6 volts and 0.8 V versus Li+/Li (FIG. 9A). For the $Fe_2O_3$/C precursor, the potential plateau at around 1.6 V can be ascribed to the intercalation of $Li^+$ into α-$Fe_2O_3$, and the other potential plateau at around 0.8

V is due to the formation of $Li_2(Fe_2O_3)$ and the reduction of Fe ions to $Fe^0$. The difference between the first cycle discharge profile of carbon decorated $Fe_3O_4$ (FIG. 7A) and the $Fe_2O_3/C$ precursor materials (FIG. 9A) illustrates the different electro-chemical reactions involved during the first cycle of Li insertion, which also indirectly proves the successful conversion from $Fe_2O_3$ to $Fe_3O_4$ by in situ partial carbothermic reduction. The voltage drop from below 0.8 to 0.01 V could be attributed to the formation of a solid electrolyte interphase (SEI) due to the decomposition of the solvent in the electrolyte.

In the first cycle charge profile, the plateau around 1.7 V is attributed to the oxidation of $Fe^0$ to $Fe^{2+}$ and $Fe^{3+}$. The first cycle discharge and charge capacities are 1579 and 917 mA h $g^{-1}$, respectively. The irreversible capacity loss of around 42% could be attributed to the decomposition of the electrolyte and formation of the solid electrolyte interphase (SEI). To better interpret the electrochemical reactions involved, the dQ/dV vs. V plots for the first two cycles are shown in FIG. 7B, which match well with plateaus discussed above. Additionally, the absence of the typical reduction peak at around 1.6 V widely observed for $Fe_2O_3$ proves that the electrode is based on $Fe_3O_4$. In the 2nd cycle, both reduction and oxidation peaks are positively shifted as compared to the 1st cycle.

The charge-discharge voltage profiles at different currents of 100, 200, 500, 1000 and 1500 mA $g^{-1}$ are shown in FIG. 7C, which are at the 2nd, 12th, 22nd, 32nd, and 42nd cycle, respectively. The charge-discharge voltage profiles at different currents almost overlap, which demonstrates the same reversible electro-chemical reactions involved. The specific discharge capacities are 919, 772, 761, 752, and 727 mA h $g^{-1}$ at currents of 100, 200, 500, 1000 and 1500 mA $g^{-1}$, respectively. As we can see, the capacity fades slowly at the currents from 200 to 1500 mA $g^{-1}$, which has been rarely observed for metal oxides tested in LIBs. And even at a high current of 1500 mA $g^{-1}$, the specific discharge capacities can still be maintained at 727 mA h $g^{-1}$, which shows improved rate performance as-compared to most reported $Fe_3O_4$ nanomaterial based anodes.

Figure 8:
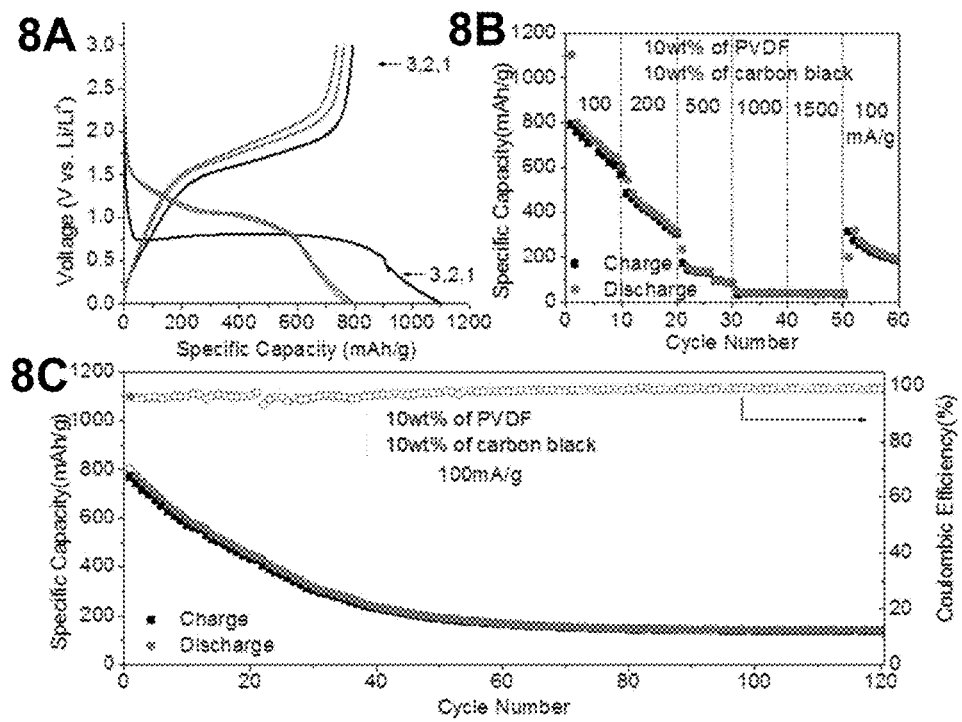
FIG. 8A is a graphical representation of an electrochemical measure of the performance of an electrode including carbon-decorated $Fe_3O_4$ nanoparticles formed by a conventional manufacturing process with an inset image of said electrode.
FIG. 8B is a graphical representation of another electrochemical measure of the performance of an electrode including carbon-decorated $Fe_3O_4$ nanoparticles formed by a conventional manufacturing process.
FIG. 8C is a graphical representation of another electrochemical measure of the performance of an electrode including carbon-decorated $Fe_3O_4$ nanoparticles formed by a conventional manufacturing process.

The rate performances of the additive-free $Fe_3O_4/C$ electrode was evaluated by charging-discharging the battery cells at different current densities for 10 cycles interval (FIG. 7D). The average Coulombic efficiency from the 2nd cycle is as high as 98.92%, which indicates the excellent electrochemical reversibility. The capacities are very stable and no distinguishable capacity drop can be observed at each current. It is interesting to highlight that no significant capacity drop was observed when current was increased from 100 mA $g^{-1}$ to 200, 500, 1000, and 1500 mA $g^{-1}$, which suggests that the electrodes could be used in fast charge LIBs. It is interesting to observe that the specific capacity was recovered to 835.5 mA h $g^{-1}$ after 60 cycles, when the current changed back to 100 mA $g^{-1}$. More interestingly, we observe an increase of capacity after the current is recovered to 100 mA $g^{-1}$ from 1500 mA $g^{-1}$. This could be explained by the continuous activating process of the electrode. Excellent cycling performance was achieved with a specific capacity at >about 800 mA h $g^{-1}$ for at least about 240 cycles (FIG. 7E). The superior electrochemical performances could be attributed to its porous structure induced good accessibility of $Li^+$ ions and improved strain accommodation and the way electrode was prepared. In contrast, the conventional electrode prepared from the same $Fe_3O_4/C$ demonstrated poor cycling relative to the novel electrode (FIG. 8A-8C), which indicates the impact of the role of electrode preparation. Thus, the porosity, the additive-free nature, the aggregation of aligned nanorods, and the substantially ellipsoid shape may all play roles in improving electrode properties over solid nanoparticles. The olive-like shape could still be observed from the sample of $Fe_3O_4/C$ nanoparticles after cycling, indicating good stability. As a comparison, the additive-free $Fe_2O_3/C$ electrode shows very poor electrochemical performance (FIG. 9A-9B).

Apart from being used in electrodes for energy storage, porous olive-like carbon decorated $Fe_3O_4$ and porous olive-like $Fe_2O_3/C$ precursor nanoparticles in accordance with the principles of the present disclosure may find use as catalysts, drug delivery, water-treatment, and sensors.

In summary, porous olive-like carbon decorated $Fe_3O_4$ was successfully prepared from porous olive-like $Fe_2O_3/C$ precursor nanoparticles. The precursor was obtained by a fast one-pot solvothermal method. The active materials were synthesized on a current collector by CAD directly without any binder, conductivity enhancer or solvent employed. When tested as negative-electrode materials for LIBs, the additive-free olive-like $Fe_3O_4/C$ electrodes exhibited excellent electrochemical performances for lithium storage demonstrating their promising potential to be carbon alternatives for LIBs.

The invention claimed is:

1. An electrode for a lithium ion battery, the electrode comprising:
   a metal current collector having a first face and a second face opposite the first face; and
   a plurality of nanoparticles having a particulate form and comprising a composite of $Fe_3O_4$ and carbon, the nanoparticles being porous and having a substantially elliptical structure, the nanoparticles being bound directly to the first face of the metal current collector without a polymeric adhesive, the nanoparticles having a carbon content by weight of less than 4%,
   wherein the electrode has a specific capacity of at least about 750 mAh/g after about 240 charge-discharge cycles.

2. The electrode according to claim 1 wherein the nanoparticle has carbon dispersed through the nanoparticle.

3. The electrode according to claim 1, having a specific capacity of at least about 700 mAh/g when exposed to a current of about 1500 mA/g.

4. The electrode of claim 1, wherein the nanoparticle is about 300 to about 600 nanometers in length, and about 200 to about 400 nanometers in diameter.

5. The electrode of claim 1, wherein the carbon content by weight of the nanoparticle is less than 1%.

6. The electrode of claim 1, wherein $\alpha$-$Fe_2O_3$ is not detected in the nanoparticle by x-ray diffraction.

7. The electrode of claim 1, wherein a length of the nanoparticle is greater than a diameter in a direction normal the length.

* * * * *